United States Patent
Bhargava et al.

(10) Patent No.: US 12,517,042 B2
(45) Date of Patent: Jan. 6, 2026

(54) WIDEFIELD PHOTOTHERMAL INFRARED SPECTROSCOPIC IMAGING

(71) Applicant: The Board of Trustees of the University of Illinois, Urbana, IL (US)

(72) Inventors: Rohit Bhargava, Champaign, IL (US); Seth Kenkel, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 308 days.

(21) Appl. No.: 18/461,937

(22) Filed: Sep. 6, 2023

(65) Prior Publication Data
US 2024/0094116 A1 Mar. 21, 2024

Related U.S. Application Data

(60) Provisional application No. 63/408,710, filed on Sep. 21, 2022.

(51) Int. Cl.
*G01N 21/35* (2014.01)

(52) U.S. Cl.
CPC .................... *G01N 21/35* (2013.01)

(58) Field of Classification Search
CPC .. G01N 21/35; G01N 21/65; G01N 23/20091; G01N 23/207; G01N 21/552; H01J 37/26; H01J 49/26
See application file for complete search history.

(56) References Cited

U.S. PATENT DOCUMENTS 11,143,672 B2  10/2021  Bhargava
11,493,323 B2  11/2022  Schnell
(Continued)

FOREIGN PATENT DOCUMENTS

WO  2019232399 A1  12/2019
WO  2021155363 A1  8/2021
WO  2022051636 A1  3/2022

OTHER PUBLICATIONS

Bai, Y. et al. Ultrafast chemical imaging by widefield photothermal sensing of infrared absorption. 5, eaav7127 (2019).
(Continued)

*Primary Examiner* — David P Porta
*Assistant Examiner* — Fani Polyzos Boosalis
(74) *Attorney, Agent, or Firm* — McDonnell Boehnen Hulbert & Berghoff LLP

(57) ABSTRACT

An imaging substrate is provided to facilitate wide field photothermal infrared spectroscopic imaging of samples disposed thereon. The substrate includes at least two reflective layers and at least one spacer layer disposed therebetween which, together, form an optical cavity. The spacer layer(s) exhibit expansion and/or refractive index change as a function of heating by incident infrared illumination. Such localized heating results in a localized change in the effective reflectivity of the substrate by locally tuning/detuning the optical cavity. Thus, the pattern of effective reflectivity of the substrate can be made to correspond to the pattern of infrared absorptivity of a sample mounted on the substrate by illuminating the sample and the substrate with infrared illumination. The pattern of effective reflectivity can then be imaged, from the opposite side of the substrate from the sample and the incident infrared illumination, using a wide field microscope or other imaging.

20 Claims, 7 Drawing Sheets

(56) References Cited

U.S. PATENT DOCUMENTS

| | | | |
|---|---|---|---|
| 11,768,150 B2* | 9/2023 | Cheng | G01N 21/35 250/339.08 |
| 11,860,087 B2 | 1/2024 | Bhargava | |
| 2019/0120753 A1* | 4/2019 | Prater | G01N 21/59 |
| 2020/0217643 A1 | 7/2020 | Schnell | |
| 2022/0108123 A1 | 4/2022 | Bhargava | |

OTHER PUBLICATIONS

Kenkel, S., Mittal, A., Mittal, S. & Bhargava, R. Probe-Sample Interaction-Independent Atomic Force Microscopy-Infrared Spectroscopy: Toward Robust Nanoscale Compositional Mapping. Analytical Chemistry 90, 8845-8855 (2018).

Schnell, M. et al. All-digital histopathology by infrared-optical hybrid microscopy. Proceedings of the National Academy of Sciences 117, 3388 (2020).

Tamamitsu, M., Toda, K., Horisaki, R. & Ideguchi, T. Quantitative phase imaging with molecular vibrational sensitivity. Opt. Lett. 44, 3729-3732 (2019).

Thomas, Photothermal Imaging of Cellular Medium, in Frontiers in Optics + Laser Science APS/DLS, OSA Technical Digest (Optica Publishing Group, 2019), paper JW4A.97. https://opg.optica.org/abstract.cfm?URI=FiO-2019-JW4A.97.

Yuan, T., Pleitez, M.A., Gasparin, F. & Ntziachristos, V. Wide-Field Mid-Infrared Hyperspectral Imaging by Snapshot Phase Contrast Measurement of Optothermal Excitation. Analytical Chemistry 93, 15323-15330 (2021).

Zhang, D. et al. Bond-selective transient phase imaging via sensing of the infrared photothermal effect. Light: Science & Applications 8, 116 (2019).

Zhang, Fluorescence-Detected Mid-Infrared Photothermal Microscopy, J. Am. Chem. Soc. 2021, 143, 30, 11490-11499, Jul. 15, 2021, https://doi.org/10.1021/jacs.1c03642.

Zong, H. et al. Background-Suppressed High-Throughput Mid-Infrared Photothermal Microscopy via Pupil Engineering. ACS Photonics 8, 3323-3336 (2021).

* cited by examiner

WIDEFIELD PHOTOTHERMAL INFRARED SPECTROSCOPIC IMAGING

CROSS-REFERENCE TO RELATED APPLICATION

This application claims priority to U.S. Provisional Patent Application No. 63/408,710, filed on Sep. 21, 2022, the contents of which are hereby incorporated by reference in their entirety.

BACKGROUND

It is desirable in many applications to characterize the chemical composition of a sample at the micro or nano scale. In some examples, this can include performing spectrometry to image the sample at the desired resolution across a range of wavelengths of interest. For example, to characterize the chemical composition (e.g., the identity of the chemical constituents) of a sample, a spectrum of infrared absorptivity of the sample can be imaged. The spectrum of absorptivity of the sample at each location across/within the sample can be used to identify the chemical composition of the sample at each of the locations across/within the sample.

SUMMARY

In a first aspect, a multi-layer substrate for photothermal imaging of a sample is provided that has a first surface on which the sample can be disposed for photothermal imaging thereof, the substrate including: (i) a mechanical support layer, wherein the mechanical support layer is transparent to a range of probe wavelengths; (ii) a first reflective layer disposed between the mechanical support layer and the first surface, wherein the first reflective layer is partially reflective and partially transparent to the range of probe wavelengths and does not transmit a range of infrared pump wavelengths; (iii) a first photothermal spacer layer disposed between the first reflective layer and the first surface, wherein the first photothermal spacer layer exhibits at least one of mechanical expansion or a change in refractive index at the range of probe wavelengths in response to photothermal heating by light within the range of infrared pump wavelengths; and (iv) a second reflective layer disposed between the first photothermal spacer layer and the first surface, wherein the second reflective layer is reflective to the range of probe wavelengths and at least partially transparent to the range of infrared pump wavelengths.

In a second aspect, a method for photothermal imaging of a sample is provided that includes: (i) mounting the sample on a first surface of a multi-layer substrate, wherein the multi-layer substrate includes: (a) a mechanical support layer, wherein the mechanical support layer is transparent to a range of probe wavelengths; (b) a first reflective layer disposed between the mechanical support layer and the first surface, wherein the first reflective layer is partially reflective and partially transparent to the range of probe wavelengths; (c) a first photothermal spacer layer disposed between the first reflective layer and the first surface, wherein the first photothermal spacer layer exhibits at least one of mechanical expansion or a change in refractive index at the range of probe wavelengths in response to heating; and (d) a second reflective layer disposed between the first photothermal spacer layer and the first surface, wherein the second reflective layer is reflective to the range of probe wavelengths and to a range of infrared pump wavelengths; (ii) illuminating the sample and the multi-layer substrate, from the first surface side of the multi-layer substrate, with infrared light at a first pump wavelength within the range of infrared pump wavelengths, thereby causing the first photothermal spacer to exhibit at least one of mechanical expansion or a change in refractive index in a pattern corresponding to a pattern of absorption of the light at the first pump wavelength by the sample; (iii) illuminating the multi-layer substrate, from a second surface side of the multi-layer substrate that is opposite the first surface side, with light at the probe wavelength; and (iv) while illuminating the multi-layer substrate with light at the probe wavelength, imaging the second surface side of the multi-layer substrate at the probe wavelength to generate a first image.

In a third aspect, a multi-layer substrate for photothermal imaging of a sample that has a first surface on which the sample can be disposed for photothermal imaging thereof, the substrate including: (i) a mechanical support layer, wherein the mechanical support layer is transparent to a range of probe wavelengths; (ii) a first reflective layer disposed between the mechanical support layer and the first surface, wherein the first reflective layer is partially reflective and partially transparent to the range of probe wavelengths; (iii) a first photothermal spacer layer disposed between the first reflective layer and the first surface, wherein the first photothermal spacer layer exhibits at least one of mechanical expansion or a change in refractive index at the range of probe wavelengths in response to heating; and (iv) a second reflective layer disposed between the first photothermal spacer layer and the first surface, wherein the second reflective layer is reflective to the range of probe wavelengths and to a range of infrared pump wavelengths.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

The accompanying drawings are included to provide a further understanding of the system and methods of the disclosure and are incorporated in and constitute a part of this specification. The drawings illustrate one or more embodiment(s) of the disclosure, and together with the description serve to explain the principles and operation of the disclosure.

DETAILED DESCRIPTION

Figure 1A:
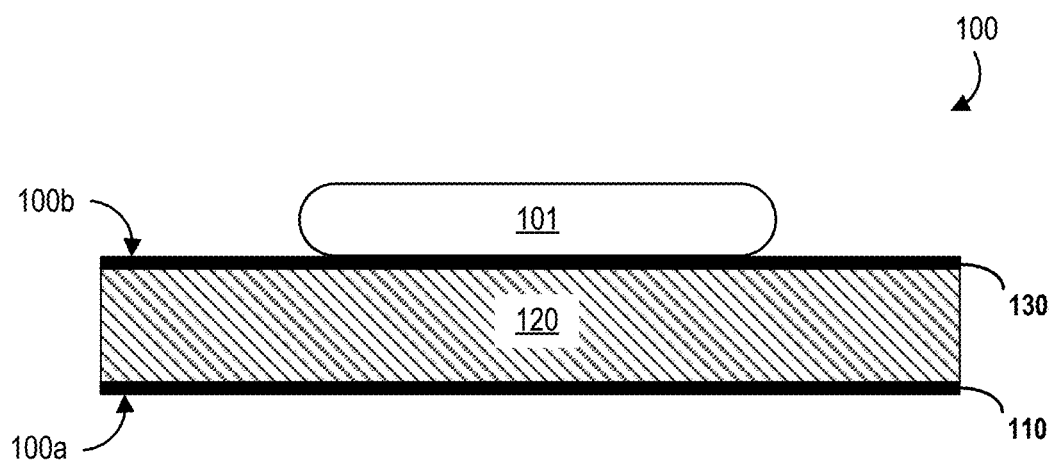
FIG. 1A depicts aspects of an example substrate.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

It is desirable in many applications to be able image the infrared absorption spectrum of a sample (e.g., a sample of biological material or tissue) at a high resolution and/or at a high rate of repetition (e.g., to generate 'video' data of the infrared absorption of the sample). This could be done, e.g., to identify and locate the molecular contents of a sample. However, prior methods for infrared spectral imaging of samples (e.g., atomic-force microscopy-based, phase contrast imaging-based, white light interferometry-based, direct imaging of IR transmission/scattering-based) have been subject to a variety of factors that limit their spatial resolution, signal-to-noise ratio, field of view, frame rate, or other properties. Such limitations can be related to being diffraction-limited at infrared wavelengths, having varying resolution with respect to surface or deep contents of a sample, relying on sample heating in a manner that introduces confounding non-chemical contrasts into the image (e.g., related to variations in refractive index, thickness, density, stiffness, etc. throughout the sample), or other factors that can degrade one or more qualities of infrared spectral image data generated by such prior methods.

Such prior methods also generally rely on the substrate or sample carrier on which a sample is mounted to minimally interact with the sample (e.g., to minimally source/sink heat, mechanical forces) and/or to minimally interact with incoming infrared or other light used to stimulate and/or image the sample (e.g., to minimally absorb or scatter infrared light used to stimulate the sample, to minimally absorb/scatter visible or other light used to image the sample via phase contrast, etc.).

The embodiments herein provide for improved infrared imaging of a sample (e.g., improved resolution, frame rate, field of view, and/or compatibility with conventional wide field microscopy systems) by using a multi-layer substrate designed to transduce infrared illumination into an effective reflectance change. When a sample is mounted on the substrate, and the substrate and sample are illuminated with infrared illumination at one or more wavelengths of interest, the infrared illumination causes a pattern of localized heating that corresponds to the pattern of absorption of the infrared illumination by the sample. This pattern of heating results in a corresponding pattern of change in the effective reflectivity of the substrate. The pattern of effective reflectivity of the substrate can then be imaged, allowing the pattern of absorption of the infrared illumination by the sample to be imaged thereby. The effective reflectivity can be imaged (e.g., using a widefield visible-light microscope) in a manner that is high-resolution, low-noise, wide field of view, high frame rate, and/or otherwise improved relative to prior methods for infrared spectral imaging of samples.

FIG. 1A depicts, by way of a non-limiting example embodiment, such a substrate 100 that is able to transduce incoming infrared illumination into a pattern of effective reflectivity for probing (e.g. visible, ultraviolet, near-infrared) light. Such a substrate 100 is able to exhibit such a property by including at least two reflective layers 110, 130 separated by at least one photothermal spacer layer 120. The two reflective layers 110, 130 and photothermal spacer layer 120 form a cavity such that 'probe' light received from a first side of the substrate 100a (a side opposite a second side 100b of the substrate on which a sample 101 is mounted and from which infrared illumination is received to stimulate the substrate 100/sample 101) is partially reflected and partially transmitted by a first reflective layer 110. The transmitted light then passes through the spacer layer 120 to reflect off the second reflective layer 130, and then passes back through the spacer layer 120 to constructively or destructively interfere with the light that was reflected by the first reflective layer 110. Local changes in the thickness and/or refractive index of the spacer layer 120 result in local changes in the degree of constructive/destructive interference, and thus changes in the local effective reflectivity of the substrate 100 across a range of wavelengths. The spacer layer 120 is configured to provide for increased absorption of infrared light across a range of wavelengths of interest and to provide for increased sensitivity of spacer thickness and/or refractive index as a function of temperature, thus resulting in increased sensitivity of the substrate 100, in terms of change in the effective reflectivity of the substrate, as a function of the intensity of the received infrared light.

Figure 1B:
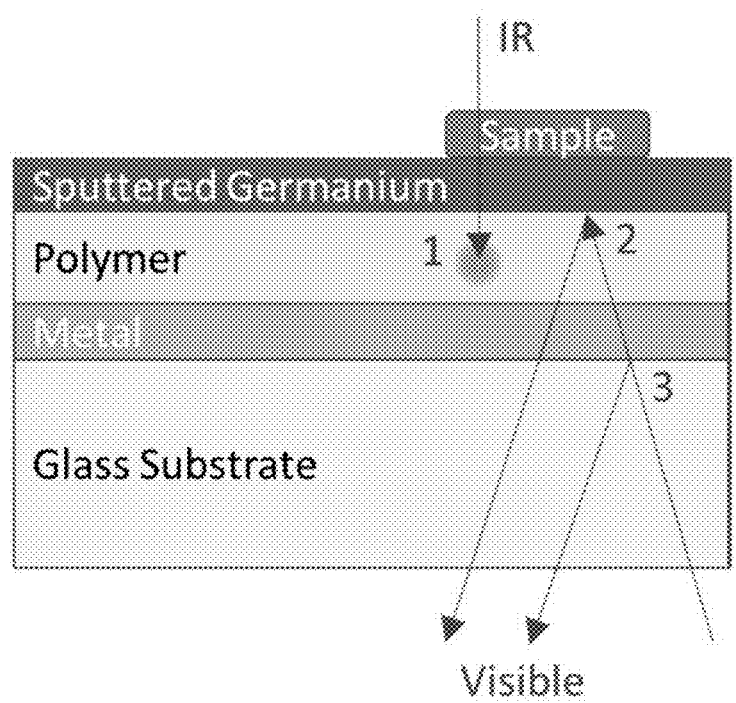
FIG. 1B depicts aspects of use of the example substrate of FIG. 1A, according to example embodiments.

FIG. 1B illustrates aspects of another example of such a substrate. The substrate of FIG. 1B includes layers of glass (as a mechanical base support layer), metal (which is reflective to infrared light and partially reflective/transmissive to visible light or some other wavelength of probe light), a polymer photothermal spacer layer, and sputtered germanium (which is reflective to the visible or other probe light and transmissive to infrared pump light), on which is disposed a sample. Incoming infrared light ("IR"), from the sample side of the substrate, illuminates the substrate and sample, thereby heating the polymer spacer layer (for example, at "1"). Due to the pattern of absorptivity of the sample with respect to the incoming infrared illumination, the pattern of heating of the polymer beneath the sample will correspond to the pattern of infrared absorption of the overlying sample. Accordingly, the pattern of change in the local thickness and/or refractive index of the polymer layer, and thus of the local effective cavity length of the polymer layer and related local pattern of reflectivity with respect to one or more wavelengths of visible, ultraviolet, or near-infrared light (e.g., visible 'probe' light used to image the pattern of effective reflectivity across the substrate at one or more wavelengths) will correspond to the pattern of infrared absorption of the overlying sample.

This pattern of effective reflectivity can thus be imaged by illuminating the substrate from the side opposite the sample ("Visible" light). A portion of the illumination will reflect off the lower layer (at "3"), while another portion of the light will be transmitted through, to reflect off of the upper layer (at "2"). This reflected light will then travel back out of the polymer layer to interfere constructively or destructively with the light that was reflected off the lower layer (at "3"). The degree of constructive or destructive interference will be related to the local cavity length of the optical cavity formed by the reflective layer and polymer layer, and thus the pattern of effective reflectivity of the substrate, which can be imaged by imaging the probe light received from the substrate, will correspond to the pattern of infrared absorption of the overlying sample.

Returning to the first illustrative example substrate 100, the substrate 100 could be configured such that the reflective layers 110, 130 and spacer layer 120 form a cavity that exhibits, at some 'zero' temperature (e.g., room temperature, a controlled temperature within a microscope device in which the substrate 100 is disposed), total destructive interference with respect to a particular wavelength of probe light (e.g., a particular wavelength of visible probe light). In such an example, imaging the substrate 100 from the direction of the first surface 100a when no infrared illumination is being provided via the second surface 100b would result in a 'blank' image, since the entire substrate 100 would exhibit no (or minimal) reflectivity. This is because all of the incoming probe light, used to image the substrate, would destructively interfere with itself due to the un-heated 'cavity' of the substrate 100 exhibiting destructive interference at the probe light wavelength.

However, if infrared illumination at one or more wavelengths of interest was being provided to the second surface 100b, then this infrared illumination would be at least partially absorbed by the spacer layer 120, resulting in changes to the thickness and/or refractive index of the spacer layer 120, thereby 'detuning' the 'cavity' of the substrate 100. This 'detuning' would result in the incoming probe light less-than-fully destructively interfering with itself, thereby resulting in an increased effective reflectivity of the substrate 100. The pattern of the detuning, and thus of the change in effective reflectivity, would be related to the intensity of the incoming infrared light that was absorbed by the spacer layer 120, and thus to the pattern of absorption of the infrared light across the sample 101 (e.g., if a region of the sample is more absorptive with respect to a particular wavelength of infrared light, then underlying regions of the spacer layer 120 will receive less of the incoming infrared light, and thus will exhibit less heating and heat-related cavity detuning). Thus, the pattern of absorption of the incoming infrared illumination will be reflected in the pattern of reflectivity across the substrate, which can thus be imaged using visible, ultraviolet, or near-infrared light.

Figure 1C:
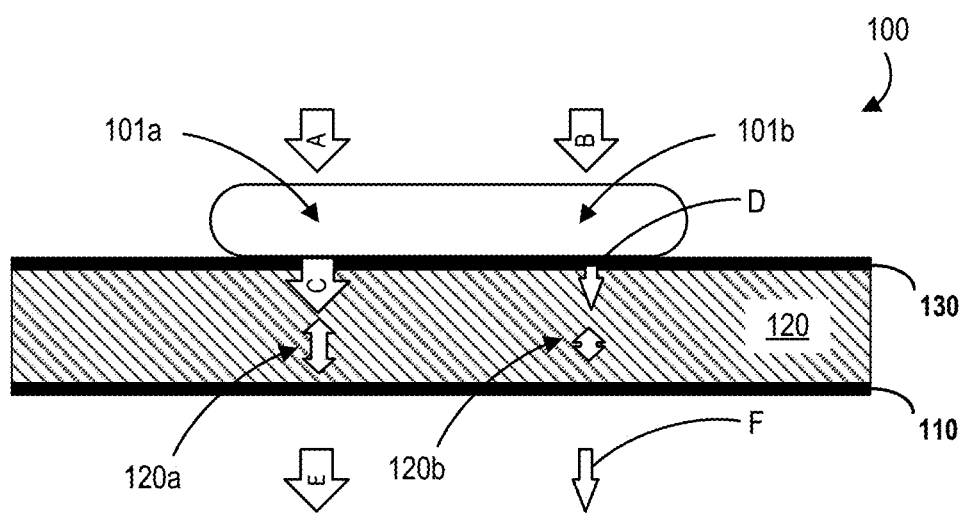
FIG. 1C depicts aspects of use of the example substrate of FIG. 1A, according to example embodiments.

FIG. 1C illustrates these factors. A first region 101a of the sample 101 exhibits relatively little absorptivity with respect to a wavelength of incoming infrared pump light, while a second region 101b of the sample 101 exhibits relatively greater absorptivity with respect to the wavelength of incoming infrared pump light. Thus, a portion of the illumination A to which the first region 101a is exposed passes relatively undiminished, as C, to an underlying first region 120a of the photothermal spacer layer 120. In contrast, a portion of the illumination B to which the second region 101b is exposed is diminished as it passes through the sample 101 (due to being absorbed more by the contents of the sample in the second region 101b) and passes as D to an underlying second region 120b of the photothermal spacer layer 120. Accordingly, the cavity of the substrate 100 in the first region 120a is detuned to a greater degree (e.g., due to greater increase in path length in the first region 120a, which may be due to increased thickness and/or changed refractive index of the spacer layer 120 material) and so exhibits a greater effective reflectivity E with respect to incoming probe light, relative to the cavity of the substrate 100 in the second region 120b which is detuned to a lesser degree and so exhibits a lesser effective reflectivity F with respect to incoming probe light.

The use of narrow-band light (e.g., visible, ultraviolet, or near-infrared narrow-band light) to image the effective reflectivity of a substrate as described herein is intended only as a non-limiting example of how to image the infrared-heating-dependent effective reflectivity of such a substrate. Other methods of imaging are possible. For example, illumination across a range of wavelengths (e.g., a range of red wavelengths) could be used to illuminate the substrate, and then the effectively reflected light within one or more bands of wavelengths could be imaged. Multiple different bands of wavelengths can be imaged, e.g., by passing the light received from the substrate through multiple filters, beam splitters, and/or other optical elements so as to present image light corresponding to respective different bands of wavelengths to respective different image sensors (e.g., charge-coupled devices, CMOS image sensors). The images for each band of received wavelengths can then be processed to determine the pattern of heating across the substrate (and thereby determine the pattern of infrared absorptivity of the sample) by, e.g., determining the pattern of the wavelengths to which the 'cavity' of the substrate is tuned across the surface of the substrate.

In some examples, one or more images of the effective reflectivity of the substrate while the sample and substrate are not being illuminated by infrared light could be taken to represent a 'zero' level of reflectivity, which can be used to compare or calibrate other images of the substrate during infrared illumination. This could be done to determine a calibration for the substrate across the area of the substrate that can then be used to determine quantitative infrared absorption images for the sample at various different infrared wavelengths.

The reflective layer closest to the sample (reflective layer 130 in FIG. 1A) can be configured to reflect substantially all (e.g., more than 95%) of incident probe light so as to avoid the probe light heating or otherwise affecting the sample in an unwanted manner while also transmitting substantially all (e.g., more than 90%) incident infrared illumination received directly from an infrared light source used to stimulate (or 'pump') the sample/substrate or received following transmission through, and partial absorption by, and overlying portion of the sample. For example, the reflective layer closest to the sample could be composed of germanium, silicon, barium fluoride, and/or some other appropriate material or combination of materials, e.g., could be a layer of germanium having a thickness between 50-200 nanometers, or between 50-100 nanometers.

The other reflective layer(s) of such a substrate (i.e., those other than the layer closest to the sample, e.g., layer 110) could have a variety of compositions and thicknesses specified to facilitate specified degree(s) of reflection and transmission of probe light such that the effective reflectivity of the substrate at one or more wavelengths is a function of the amount of heating experienced by the spacer layer(s). For example, the other reflective layers could be comprised of at least one of silicon, germanium, gold, or aluminum.

The photothermal spacer layer(s) of such a substrate (e.g., photothermal spacer layer 120) could be composed of materials specified to increase absorption of infrared across a range of infrared wavelengths of interest and/or to increase a sensitivity of the thickness and/or refractive index of such a spacer layer to heating as a result of absorption of such infrared light. For example, such a photothermal spacer layer could include poly-methyl methacrylate, silicon, germanium, or some other material that exhibits a high degree of change in refractive index and/or thickness as a function of change in temperature. Such materials could also have a high degree of absorptivity for infrared wavelengths of interest and low absorptivity for probe wavelengths. In some examples, an additive could be added to the bulk material of such a photothermal spacer layer to improve the absorptivity of the photothermal spacer layer to infrared light, thereby increasing the sensitivity of the effective reflectivity of substrate as a function of incident infrared light. Such additives could include particles of carbon/graphite, conductive nanoparticles (e.g., gold nanoparticles), or some other additive materials.

The geometry of the reflective layer(s) and photothermal spacer layer(s) of the substrate (e.g., the thicknesses of the layers), as well as their optical properties (refractive index, permittivity, permeability, conductivity, etc.) could be specified, as described elsewhere herein, to adjust an amount of constructive and/or destructive interference the substrate exhibits with respect to one or more wavelengths of probe light as a function of temperature. So, for example, the substrate could be configured to exhibit minimal effective reflectivity at a specified temperature for a specified wavelength by configuring the substrate such that the reflective layers and spacer layer therebetween form an optical cavity having an optical length of ¼ the wavelength, ¾ the wavelength, 1¼ the wavelength, etc., such that the reflective layers and spacer layer cause destructive interference to light at the specified wavelength. Alternatively, to maximize the effective reflectivity at a specified temperature for a specified wavelength, the substrate could be configured such that the reflective layers and spacer layer therebetween form an optical cavity having an optical length of ½ the wavelength, the wavelength, 1½ the wavelength, etc., such that the reflective layers and spacer layer cause constructive interference to light at the specified wavelength. Configuring the substrate such that the reflective layers and spacer form a cavity with an optical length that is longer can result increased sensitivity of the effective reflectivity as a function of received infrared light, though it can also result in reduced resolution due to increased heat spreading through such a thicker spacer layer. Accordingly, this aspect of the geometry of the substrate can be optimized to enhance one or the other of resolution or sensitivity, according to an application of interest.

To generate a full infrared absorption spectral image of the sample, the substrate could be imaged multiple different times, while/following illumination of the sample and substrate with infrared light at respective different infrared wavelengths. Additionally or alternatively, other methods for stimulating the sample and substrate in a manner that results in informative changes in the effective reflectivity of the substrate. A sample could be stimulated with infrared pump light and imaged with probe light (e.g., visible, ultraviolet, or near-infrared probe light) a plurality of times, e.g., at a regular rate to generate video image data about the infrared absorptivity of the sample. Where such repeated infrared stimulation and imaging occur, the timing of the 'pump' infrared light and the 'probe' light (and imaging thereof) could be phased relative to each other such that the magnitude of the resulting change in the imaged effective reflectivity is increased or maximized. For example, the effective reflectivity could be imaged at a set time (e.g., a time related to the thickness and thermal conductivity of the substrate, e.g., a time less than 500 nanoseconds for a substrate that has a thickness of the IR-absorbing layers less than 500 nanometers) following infrared illumination of the substrate/sample such that the effect of such infrared heating on the thickness, refractive index, and/or other relevant properties of the spacer layer, and thus on the effective reflectivity of the substrate, is increased or maximized.

Figure 3:
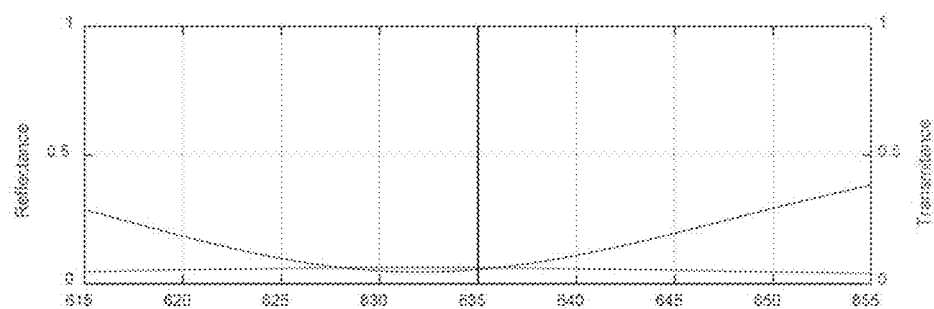
FIG. 3 depicts experimental results.
Figure 3:
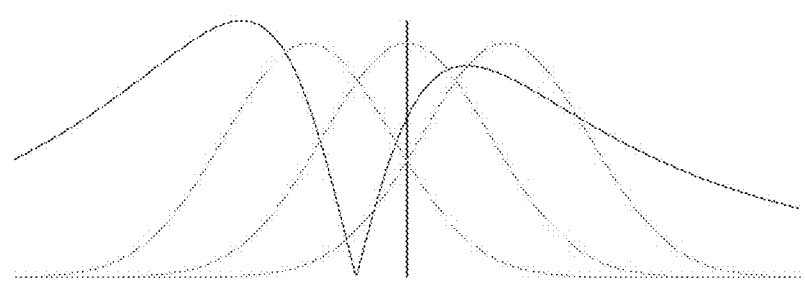

FIG. 3 illustrates the dependence of the optical properties of such a substrate on the wavelength of the light used to illuminate the substrate. The simulated substrate used to develop the information of FIG. 3 was a 589 nm layer of poly-methyl methacrylate sandwiched between a 30 nm layer of gold (on the side opposite the sample side of the substrate) and a 50 nm layer of germanium (on the sample side). As shown, the overall transmittance of the substrate (from the sample-opposite side all the way through to the sample side) was relatively flat with respect to wavelength, while the reflectance of the layer (i.e., the proportion of light incident onto the substrate from the sample-opposite side that is reflected back toward the sample-opposite side) exhibited a deep dip at the design wavelength of 635 nm. The bottom pane of FIG. 3 depicts, as the black trace, the percentage change in reflectance of the substrate as a result of a 1 K change in temperature of the substrate as a function of wavelength. Such a change also corresponds to a change in the central wavelength of the reflectivity dip (e.g., related to a temperature-mediated change in the length of the cavity between the reflective layers). The degree of such a shift, and thus the temperature of the polymer layer/degree of infrared absorptivity of the overlaying portion of a sample can be detected by detecting the movement of that dip. This can be done, e.g., by illuminating the sample with light at wavelengths spanning the illustrated range of visible wavelengths and then passing the reflected light through a number (e.g., three) of different wavelength-selective filters to image is (with the spectral bandwidth of the filters illustrated by way of example by the yellow curves in the bottom pane of FIG. 3).

Figure 4:
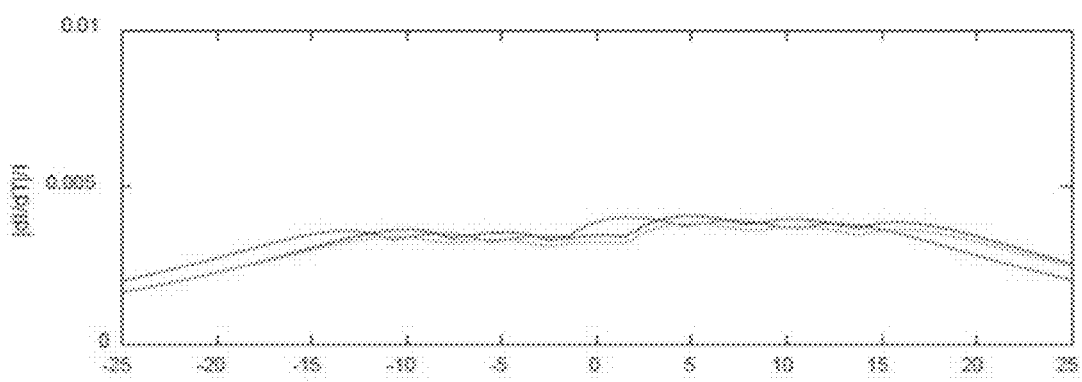
FIG. 4 depicts experimental results.
Figure 4:
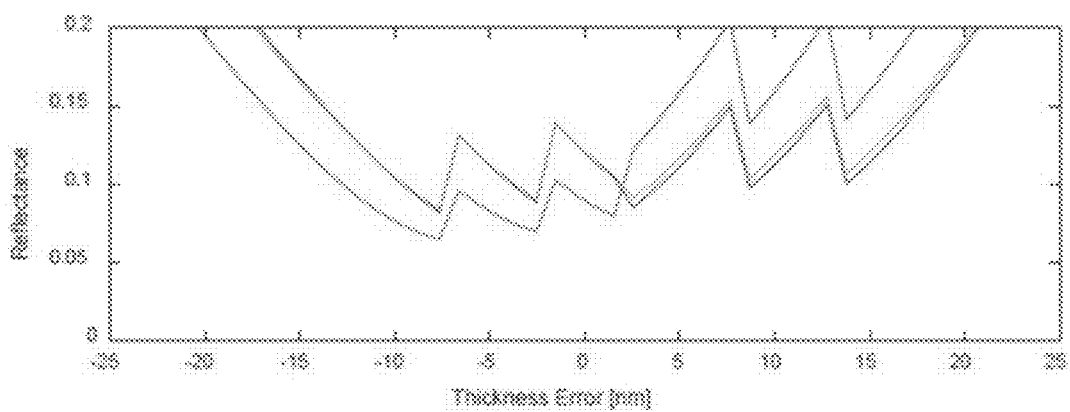

The performance illustrated in FIG. 3 can be achieved via relatively low-cost thin film fabrication techniques, e.g., spin coating, sputtering. FIG. 4 illustrates the total percent change in the intensity of light reflected from such a substrate as a function of error in the photothermal polymer film thickness (top pane). This data shows that such a film can be manufactured to film thickness tolerances of 589+/−15 nm, which is achievable with spin coating. The bottom pane of FIG. 4 illustrates the dependence of the substrate reflectance as a function of error in the photothermal polymer film thickness at nominal conditions (blue trace), at 60 Celsius ambient conditions (red trace), and with an elevated sample refractive index (yellow trace). These results indicate that a substrate as described herein can be used to generate infrared absorption imaging data that is relatively free from non-chemical artifacts, and further that the overall reflectivity (approximately 10% or greater) is high enough to overcome small sources of stray reflectance.

Figure 2A:
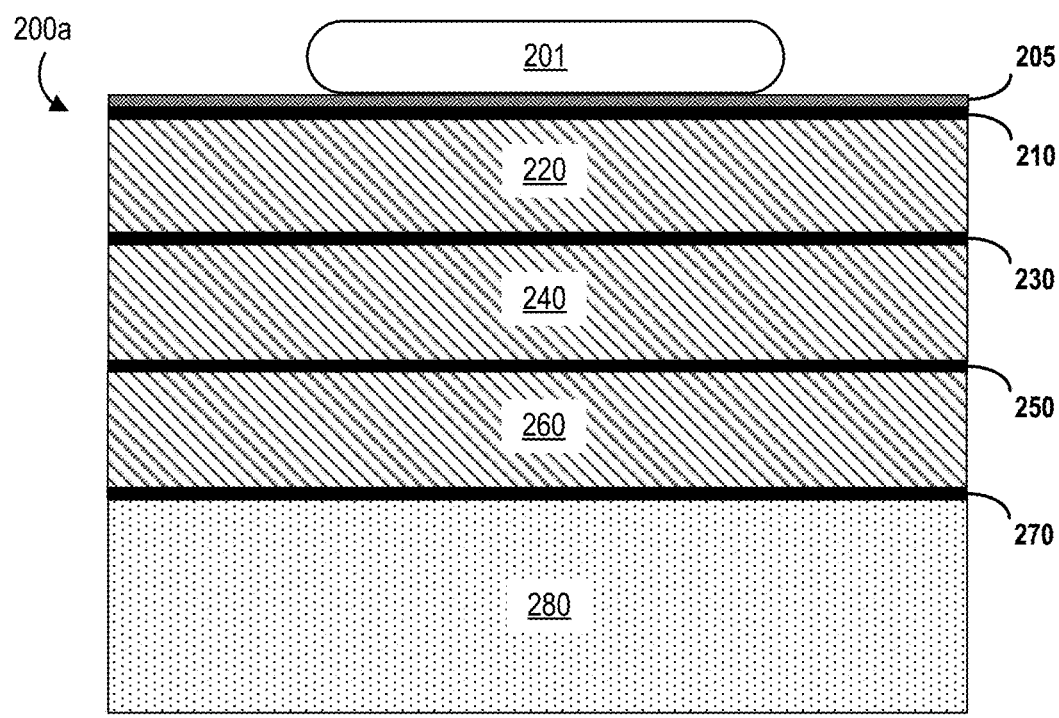
FIG. 2A depicts aspects of an example substrate.
Figure 2B:
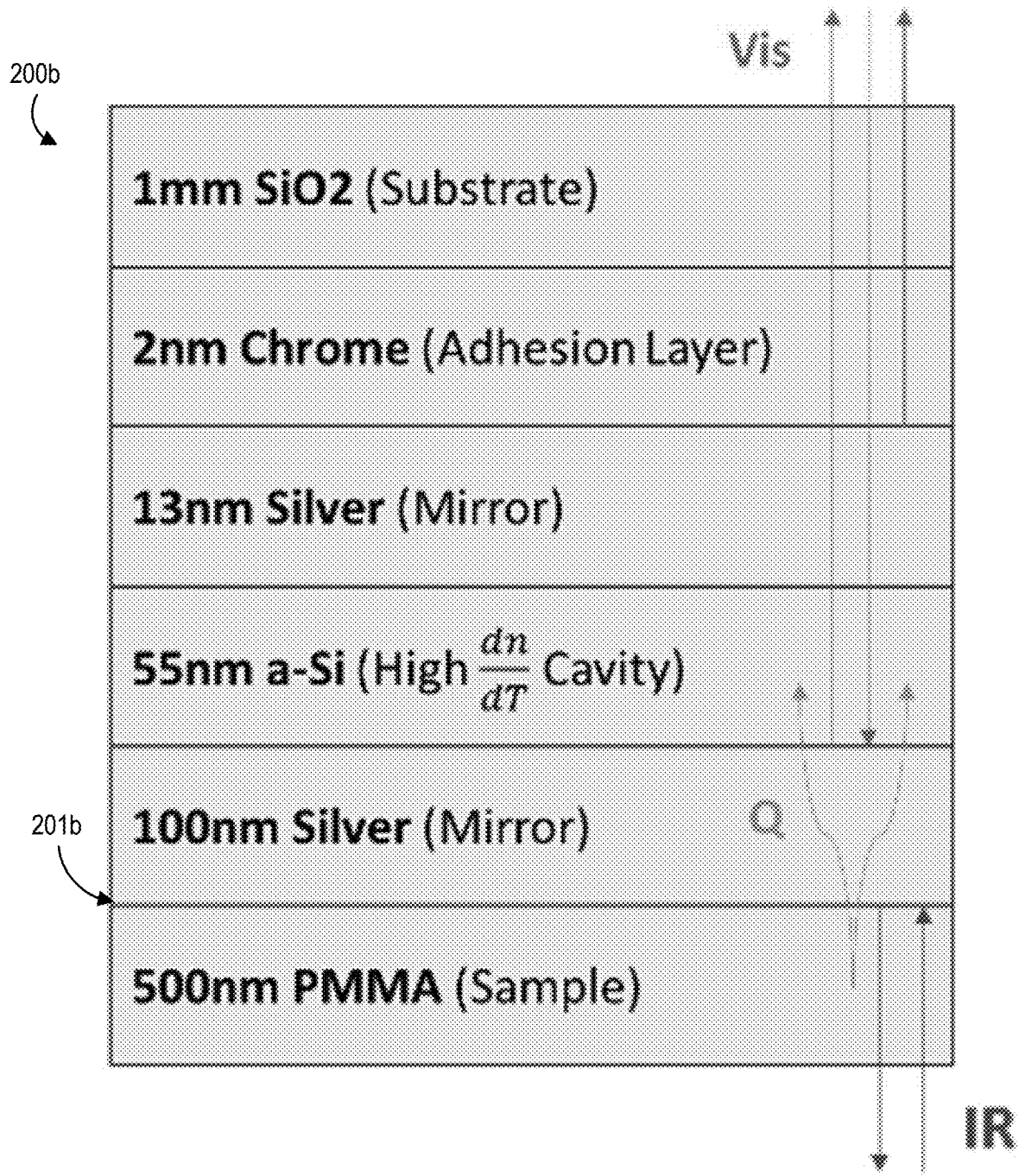
FIG. 2B depicts aspects of an example substrate.

A substrate as described herein for making photothermal images of a sample could be improved or otherwise modified in a variety of ways relative to the simple substrate 100 depicted in FIGS. 1A and 1B. FIGS. 2A and 2B depicts substrates 200a, 200b. However, the substrates 200a, 200b of FIGS. 2A-B are intended as non-limiting example embodiments; a substrate as described herein could include a subset (e.g., only one) of the modifications described in relation to FIGS. 2A-B.

For example, such a substrate could include multiple photothermal spacer layers separated by and capped with more than two reflective layers. Such additional photothermal spacer layers and associated reflective layers could be configured to form a multi-layer interferometer. The substrate 200a includes a first 210, second 230, third 250, and fourth 270 reflective layers that alternate with first 220, second 240, and third 260 photothermal spacer layers. Such multi-layer design could be used to improve the quality of the temperature-sensitive constructive and/or destructive interference exhibited by the substrate 200a (e.g., to result in a temperature-sensitive effective reflectance with respect to a very narrow band of probe wavelengths), to exhibit such temperature-sensitive effective reflectance with respect to a number of different bands of probe wavelengths, to increase a sensitivity of the effective reflectance to changes in temperature and/or infrared illumination by the substrate, or to provide some other benefit.

Additionally or alternatively, such a substrate could include a mechanical support layer on which the photothermal spacer layer(s) and reflective layers are disposed. The substrate 280 includes such a mechanical support layer 280. Such a mechanical support layer could be provided to increase the durability of the substrate, to simplify mounting of samples to the substrate and/or handling of the substrate (e.g., to mount the substrate in an imaging apparatus), to facilitate fabrication of the substrate (e.g., to facilitate formation of the stacked reflective layers and photothermal spacer layers by spin coating, chemical or physical vapor deposition, sputtering, polishing, or some other process(es)), or to provide some other benefit. Where such a mechanical support layer is disposed on the side of the substrate from which probe light is provided/imaged (e.g., the side of the substrate opposite the side on which a sample is mounted), the mechanical support layer could be composed of glass or some other material that is substantially transparent to the wavelengths of light of such probe illumination. The material of the mechanical support layer could be minimally absorptive of infrared light, in order to reduce confounding effects related to heating of the mechanical support layer by pump infrared light that passes all the way through the sample and/or reflective layers. Additionally or alternatively, the final reflective layer (e.g., 110, 270) could be substantially reflective to a band of wavelengths of infrared pump light.

Additionally or alternatively, such a substrate could include an insulating layer (e.g., 205) disposed between the sample and the reflective layer closest to the sample. Such an insulating layer could act to prevent heat from the sample from being conducted into the substrate, thereby introducing noise into and/or reducing the contrast of images, taken of the effective reflectance of the substrate, of the pattern of infrared absorptivity of the sample (e.g., 201). Such an insulating layer could also be substantially transparent to infrared light. For example, such an insulating layer could include barium fluoride.

In some examples, the spacer layer(s) of such a substrate could be prevented from being directly exposed to (and thus directly heated by) infrared light. Instead, pump infrared light could be used to heat a sample and the heat generated by this infrared exposure could then travel, via conduction, into one or more spacer layer(s). Since such spacer layers would not need to exhibit absorptivity with respect to the pump infrared light, only an enhanced sensitivity of thickness and/or refractive index with respect to changes in temperature of the spacer layer(s), such spacer layer(s) could be referred to as "thermal spacer layer(s)", rather than "photothermal spacer layer(s)." For example, such a thermal spacer layer could be composed of amorphous silicon or some other material that exhibits a high degree of dependence of refractive index (or volume) on temperature (e.g., a layer of amorphous silicon with a thickness greater than 55 nm). Such substrates could include "buffer" reflective layer(s) between the sample-bearing surface and the spacer layer(s), such buffer reflective layers exhibiting more complete reflectivity with respect to infrared pump light and with respect to visible/ultraviolet/near-infrared probe light. For example, such a substrate could include a layer of silver or some other material that is highly reflective to infrared pump light and to visible/ultraviolet/near-infrared probe light (e.g., a layer of silver having a thickness greater than 75 nm).

The presence of such a buffer reflective layer could improve the rejection of image noise related to direct optical interactions between the sample and the probe light, thereby improving the sensitivity of the substrate to the pattern of infrared absorptivity of the sample. The thickness and composition of the buffer reflective layer, as well as other layers (e.g., thermal spacer layer(s), other partially reflective layer(s)) could be specified to enhance the resolution of features in the pattern of infrared absorptivity within the sample, e.g., to enhance conduction of heat from the sample to the thermal spacer layer(s) through the buffer reflective layer while also reducing lateral spreading of heat along the buffer reflective layer and/or thermal spacer layer(s).

FIG. 2B depicts an example substrate 200*b* that includes a buffer reflective layer ("100 nm Silver (Mirror)") configured to reflect both pump infrared light (arrows at bottom, "IR") and probe visible/ultraviolet/near-infrared light (arrows at top, "Vis"), thereby more completely optically segregating the spacer layers from the sample side of the substrate 200*b*. The substrate 200*b* includes a surface 201*b* (the surface of the buffer reflective layer toward the bottom of FIG. 2B) on which a sample ("500 nm PMMA (Sample)") can be mounted to be imaged. A thermal spacer layer ("55 nm a-Si (High do/dT Cavity)") composed of a material that exhibits an enhanced amount of expansion and/or refractive index change as a function of change in temperature is disposed on the opposite side of the buffer reflective layer. A second reflective layer ("13 nm Silver (Mirror)") is disposed opposite the thermal spacer layer from the buffer reflective layer and forms, with the thermal spacer layer and the buffer reflective layer, an optical cavity whose effective reflective properties are a function of the pattern of thickness and/or refractive index of the thermal spacer layer. The substrate 200*b* also includes a mechanical support layer ("1 mm SiO2 (Substrate)") composed of glass that is transparent to the probe light and an adhesion layer ("2 nm Chrome (Adhesion Layer)") to enhance the adhesion of the second reflective layer to the mechanical support layer and/or to facilitate the formation of the second reflective layer on the mechanical support layer.

Exposure of a sample mounted on the substrate 200*b* to infrared pump light results in the sample being heated in a pattern corresponding to the pattern of infrared absorptivity of the sample. This pattern of heating is then transferred, via heat conduction ("Q"), to a pattern of temperature change in the thermal spacer layer, and thus to a pattern of change in the refractive index and/or thickness of the thermal spacer layer. As with the other substrates described herein (e.g., 100, 200*a*), such changes in the refractive index and/or thickness of the thermal spacer layer result in detuning/tuning of the cavity formed by the second reflective layer, thermal spacer layer, and buffer reflective layer, allowing the pattern of infrared absorptivity of the sample to be optically imaged as a pattern of reflectivity across the substrate 200*b*.

Note that some embodiments herein depict the imaging of the pattern of infrared absorptivity of a sample by illuminating the sample and a substrate on which it is mounted such that the absorption of the infrared light by the sample casts a 'shadow' onto the substrate according to the pattern of IR absorptivity of the sample. This shadow pattern of infrared then results in corresponding heating of the substrate, which is transduced by the substrate into a pattern of effective reflectivity at one or more wavelengths (e.g., visible, ultraviolet, near-infrared) which can then be imaged (e.g., using a wide field microscope or other variety of microscope, with the substrate mounted at a focal plane of the microscope). However, other mechanisms for patterned transfer of energy from the sample and/or from an illumination source into such a substrate are possible. For example, such an energy transfer could be effected by surface plasmon resonance at a top interface of the substrate, onto which the sample is mounted. Additionally or alternatively, as with the substrate 200b depicted in FIG. 2B, the pattern of heating of the sample could be transmitted, via conduction through a 'buffer' reflector layer, into a pattern of heating of a thermal spacer layer.

The methods described herein can be modified in a number of ways to improve the optical detection of the pattern of infrared absorptivity of a sample in response to illumination by infrared pump light. For example, the infrared pump light can be pulsed, and the timing between the pulse of the timing of optical imaging of the substrate could be specified such that the effect on the optical properties of the substrate by the pulse of infrared pump light is maximized. Additionally or alternatively, the infrared pump light could be varied over time according to an oscillating waveform (e.g., a sinusoid) and information about the pattern of infrared absorption of the sample could be determined by detecting the magnitude and/or phase (relative to the timing of the waveform of the applied infrared pump light) of variation in reflectivity of the sample at a plurality of points across the sample (e.g., at each pixel of a camera or other imager used to image the probe light used to interrogate the reflectivity of the substrate). Indeed, such a method of imaging could improve the noise characteristics of the infrared absorptivity image by allowing various filtering techniques (e.g., lock-in amplification or other methods to extract the components of the images that vary at the same frequency as the applied infrared pump light) to reject aspects of the image data that do not correspond to the time-varying infrared pump light.

The use of regularly-oscillating patterns of infrared pump light to excite the sample could also allow for increases in the degree of resolution of the images, with respect to infrared absorptivity, without increasing the resolution of the imager with respect to the magnitude of received optical probe light. Since the substrates described herein improve the isolation of the optical probe light from the sample, the image information represented by the optical probe light exhibits less variation owing directly to optical structure in the sample; rather, all or almost all of the image information represents the pattern of infrared absorptivity of the sample. Accordingly, the intensities of the optical probe light received by the optical imager (e.g., across the pixels of the images) will exhibit a narrower range. The camera can thus bias about the middle of this narrower range, allowing for increased resolution of the magnitudes of the optical probe light received within the range (e.g., by allowing the imager gain to be increased without clipping, due to the biasing within the narrower range of observed intensities), leading to increased image sensitivity (e.g., $H_T^{adj} > 4*10^{-4}$).

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

II. ADDITIONAL THEORETICAL AND EXPERIMENTAL VALIDATION

The resolution of systems and methods described herein can be defined as the spread of temperature in a polymer film that acts as an experimental stand-in for a sample of interest. A custom analytical model was developed to relate arbitrary 3D heating to temperature in a layered sample. For the dimensions shown in FIG. 5, 3 200 nm square heat sources were simulated in the polymer film, separated by 200 nm. The line profile of the heating and the resulting average temperature in the film is shown in FIG. 5.

Figure 5:
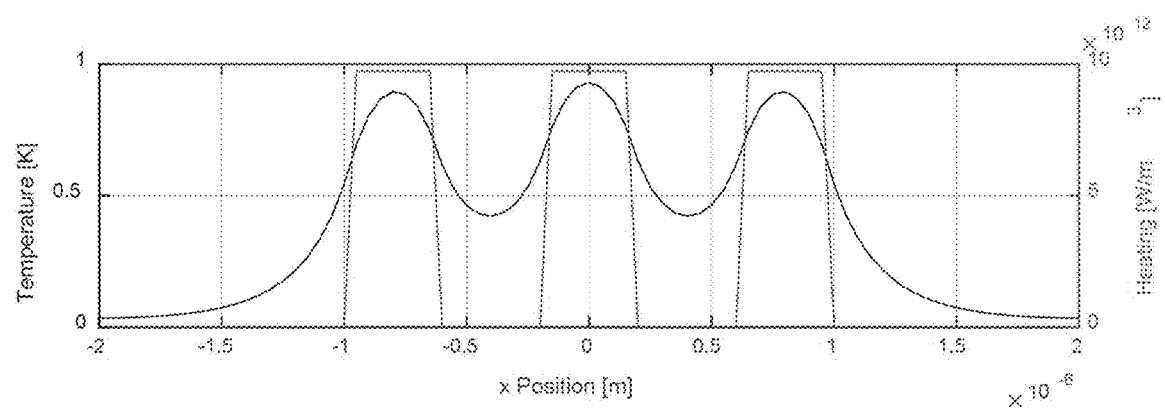
FIG. 5 depicts experimental results.

As shown in FIG. 5, an approximately 50% reduction in modulation amplitude of the temperature was observed at that spacing, suggesting that the resolution is on the order of 200 nm. This also suggests, for such realistic heating values, that an approximately 1K temperature change can be induced in the film (assuming 100 mW power, 100 um FOV, at 1732 cm for PMMA). This should induce an approximately 0.5% intensity change which can be digitized by a 10 bit resolution camera (or better) with an SNR of 5.

An analytical description of image formation of IR photo-induced reflectance change in a thin resonant cavity film (e.g., as in the substrates described herein) detected using an incoherent bright field microscope is provided herein. This analytical description is provided as an example of how to describe the substrates herein and imaging thereof to generate information about the infrared absorptivity of samples mounted to such substrates; other descriptions are possible. Such an analytical description can be used to optimize properties of a substrate as described herein in order to improve imaging of samples mounted thereto (e.g., to specify layer thicknesses, for a given set of compositions thereof, in order to increase spatial and/or intensity resolution of the infrared absorptivity image for a given set of pump and/or probe illumination parameters).

The general expression for an image S at a camera sensor is described as follows:

$$S(x, \phi) = \frac{1}{\tau} \frac{1}{2\Delta\lambda} \int_0^\tau \int_{\lambda_o-\Delta\lambda}^{\lambda_o+\Delta\lambda} R(x, \lambda, t) \times I_{probe}(x, \phi, \lambda, t) d\lambda dt, \quad (1)$$

$$I_{probe}(x, \phi, \lambda, t) = I_o(x, \lambda)(1 + M\cos(\omega t + \phi)).$$

The image S is a function of sample position x and the temporal phase of the harmonic probe intensity. The camera integrates the intensity observed at the detector plane with respect to time t and wavelength λ. The intensity at the detector plane (a conjugate image plane with the resonant cavity film) is equal to the reflectance of the resonant cavity film R(x, λ, t) times the probe intensity $I_{probe}$(x, φ, Δ, t). To isolate a harmonic reflectance variation, the probe intensity is modulated with frequency ω and temporal phase φ. To isolate a small harmonic reflectance change, the sample reflectance can be decomposed as follows:

$$R(x, \lambda, t) = R_o(x, \lambda) + \frac{dR(x, \lambda)}{dT} T_f(x, \omega, t), \quad (2)$$

$$T_f(x, \omega, t) = R(T(x, 0)) + R(T(x, i\omega))\cos(\omega t) + T(T(x, i\omega))\sin(\omega t),$$

$$T(x, s) = \int\int\int_\Omega g(x, x_o, s) Q(x_o) dx_o.$$

The reflectance of the film can be decomposed into a nominal reflectance $R_o$(x, λ) plus a temperature-dependent reflectance. Assuming small temperature variation, temperature-dependent reflectance can be described with a linear form equal to $$\frac{dR(x, \lambda)}{dT}$$

times the temperature in the film $T_f(x, \omega, t)$. The temperature in the film has a DC component $\Re(T(x, 0))$, an in-phase harmonic component $\Re(T(x, i\omega))$, and a quadrature harmonic component $\Im(T(x, i\omega))$. Here, each of these terms can be described as either the real or imaginary part of the Laplace-domain, Green's function evaluated at their respective temporal frequencies. The Green's function $g(x, x_o, s)$ relates arbitrary 3D heating in the sample/film domain to temperature. Higher harmonic temperature solutions are omitted herein for clarity but, in practice, are unlikely to contribute significantly to the solution, assuming the probe intensity reasonably approximates a perfect sine wave. For the analyses herein, 3 assumptions are made:

1) The probe modulation profile is a perfect sine wave;
2) The integrand of equation 1 has negligible variation with respect to wavelength; and
3) The integration window $\tau$ is precisely N periods of the harmonic frequency $$\tau = NT = \frac{2\pi N}{\omega}.$$

Applying these assumptions and simplifying the results using trig identities, the following can be derived:

$$S(x, \phi) = S_{DC}(x) + S_R(x)\cos(\phi) + S_T(x)\sin(\phi), \quad (3)$$

$$S_{DC}(x) = R_o(x, \lambda_o)I_o(x, \lambda_o) + \frac{dR(x, \lambda)}{dT}R(T(x, 0))I_o(x, \lambda_o),$$

$$S_R(x) = \frac{M}{2}I_o(x, \lambda_o)\frac{dR(x, \lambda)}{dT}R(T(x, i\omega)),$$

$$S_T(x) = -\frac{M}{2}I_o(x, \lambda_o)\frac{dR(x, \lambda)}{dT}T(T(x, i\omega)).$$

Three terms arise with respect to harmonics of the controllable phase shift $\phi$. The DC reflectance term $S_{DC}(x)$ is dominated by the nominal reflectance of the sample whereas the in-phase $S_R(x)$ and quadrature $S_\Im(x)$ terms scale with the real and imaginary harmonic temperature variations in the film. Via the Green's function, this temperature variation is proportional to the local IR absorption in the sample domain with resolution that scales inversely with pulsing frequency. Thus, a goal is to isolate the terms which scale with the harmonic heating. To achieve this, a system of equations can be formed by measuring multiple values of the probe phase shift $\phi$ to isolate these three terms. For example, the equation below depicts the system for 5 phase shifts:

$$\begin{bmatrix} S_1 \\ S_2 \\ S_3 \\ S_4 \\ S_5 \end{bmatrix} = \begin{bmatrix} 1 & \cos(\phi_1) & \sin(\phi_1) \\ 1 & \cos(\phi_2) & \sin(\phi_2) \\ 1 & \cos(\phi_3) & \sin(\phi_3) \\ 1 & \cos(\phi_4) & \sin(\phi_4) \\ 1 & \cos(\phi_5) & \sin(\phi_5) \end{bmatrix} \begin{bmatrix} S_{DC} \\ S_R \\ S_T \end{bmatrix}. \quad (4)$$

Solving for the 3 fields on the right can include inverting this non-square matrix, e.g., using the Moore-Penrose pseudoinverse.

The analytical techniques described above were used to design the substrate 200b depicted in FIG. 2B, which includes an optical resonant cavity with high thermal responsivity. The reflectance change per temperature change ("Irs") and percentage reflectance change per temperature change ("dTIrs") when illuminating the sample with a 100 mW beam of infrared pump light with a beam field of view of 500 microns oscillating at 100 kHz and having a wavelength of 1732 cm$^{-1}$ are shown in FIG. 6A.

Figure 6A:
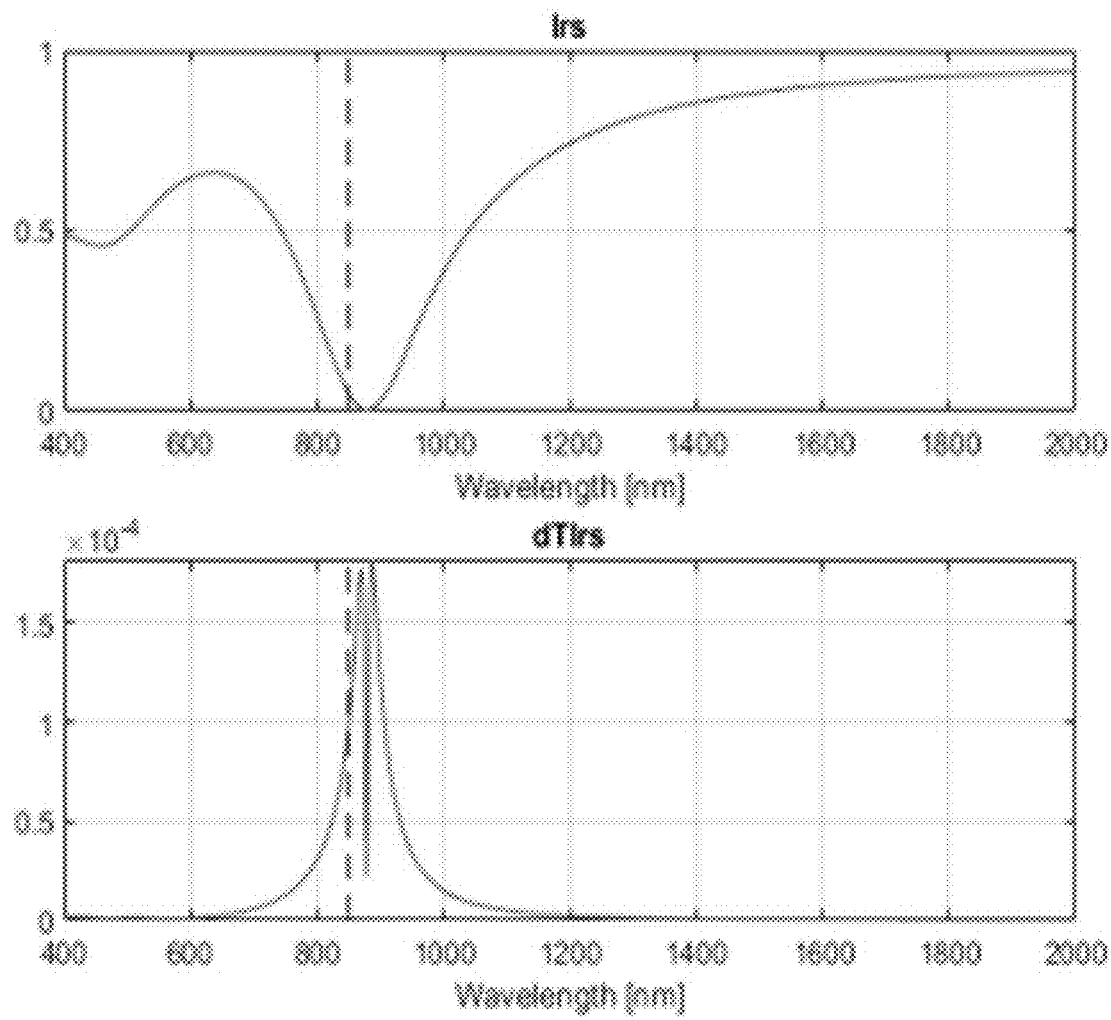
FIG. 6A depicts experimental results.

As shown in FIG. 6A, the model predicted about 2 in 10000 change in reflectance. Practical resonator layers have roughness that can contribute to scattering losses, leading to lower resonant Q-factor and the observed 5× lower thermal responsivity than would be expected from the refractive index values of the resonator spacer material.

Figure 6B:
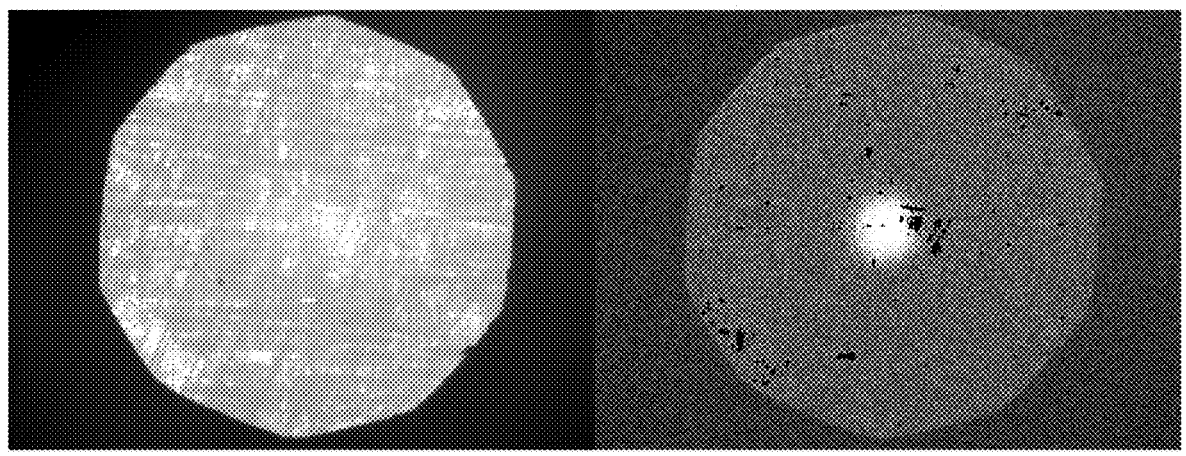
FIG. 6B depicts experimental results.

A bright field microscope was constructed to experimentally validate the embodiments described herein. The primary components of the microscope included: an Olympus plan achromat 10× objective (Thorlabs RMS10×), a 200 mmFL tube lens (Thorlabs TTL200), and a monochrome Zelux camera (Thorlabs CS165MU). The optical resonant cavity film was prepared using sputter coating and the PMMA simulated sample film was applied via spin coating. FIG. 6B depicts images of the DC output (SDC, left image) of the optical microscope camera and the AC output (|SR+iSI|, right image) of the optical microscope camera.

Figure 6C:
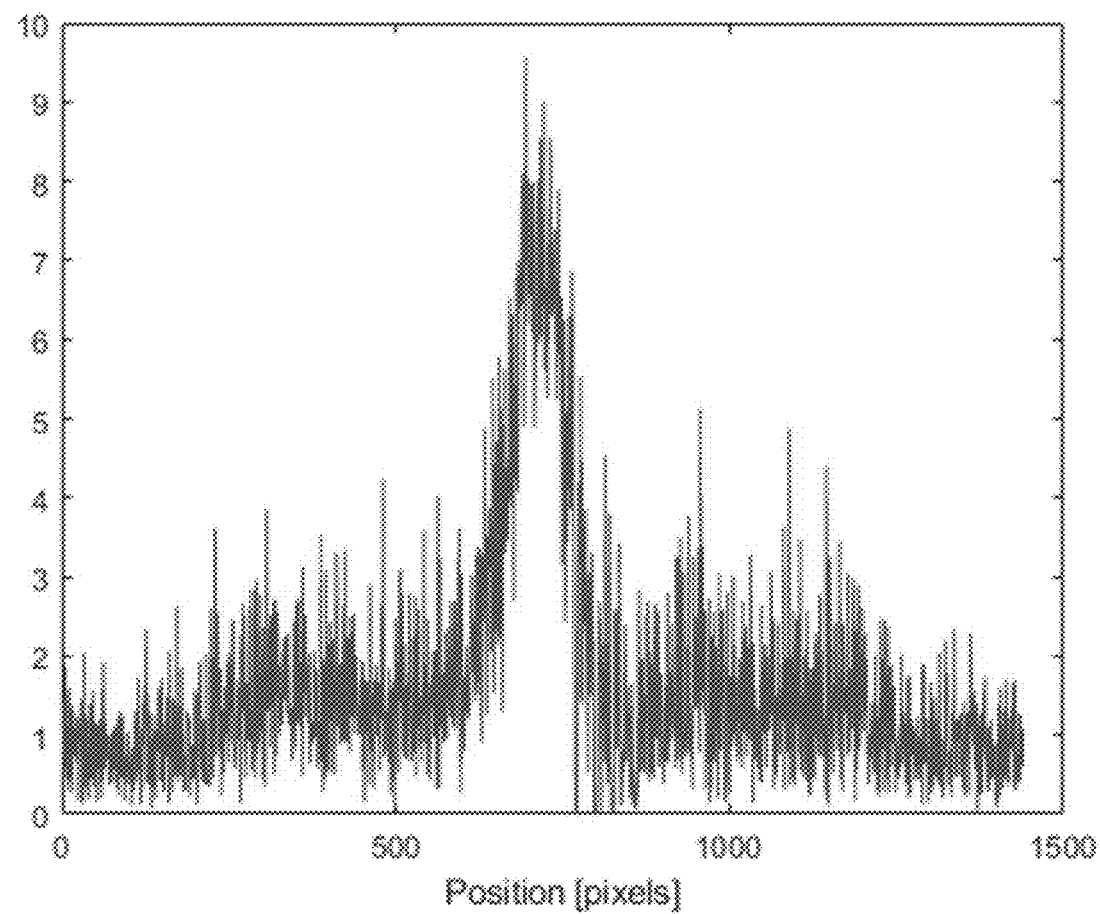
FIG. 6C depicts experimental results.

FIG. 6C depicts a line profile across the IR spot in the AC reflectance images of FIG. 6B. This configuration produced approximately 3 bits out of a total of 10 bits of signal. In addition, the IR intensity at the sample was measured as ~20 mW (lower than simulation) and an FOV of ~50 um (lower than simulation). From this data, the design sensitivity can be compared with the as-fabricated sensitivity by adjusting for these two factors as follows:

$$H_T = \left(\frac{2^3}{2^{10}}\right)\left(\frac{100 \text{ mW}}{20 \text{ mW}}\right)\left(\frac{50 \text{ μm}}{500 \text{ μm}}\right)^2 = 4*10^{-4}. \quad (5)$$

Here, the thermal sensitivity is the ratio of the AC to the DC magnitude which are about $2^3$ and $2^{10}$, respectively. Adjusting for differences in IR power and spot size from simulation, find the sensitivity as determined to be about 0.0004 compared to the predicted 0.0001, showing better performance than predicted.

These results can be further improved by, among other things, reducing scattering in the films (~5×-10× improvement), improving transfer of IR beam energy to the to sample (~5× improvement, as approximately 3-5× of the signal was lost to this mechanism in the experiments), using a 50% duty cycle with a modern QCL laser capable of CW operation (~5× improvement in $1^{st}$ harmonic AC signal performance), using a better camera that exhibits lower noise, and/or adjusting the camera gain/bias as described above (~5×-10× improvement).

III. EXAMPLE METHODS

Figure 7:
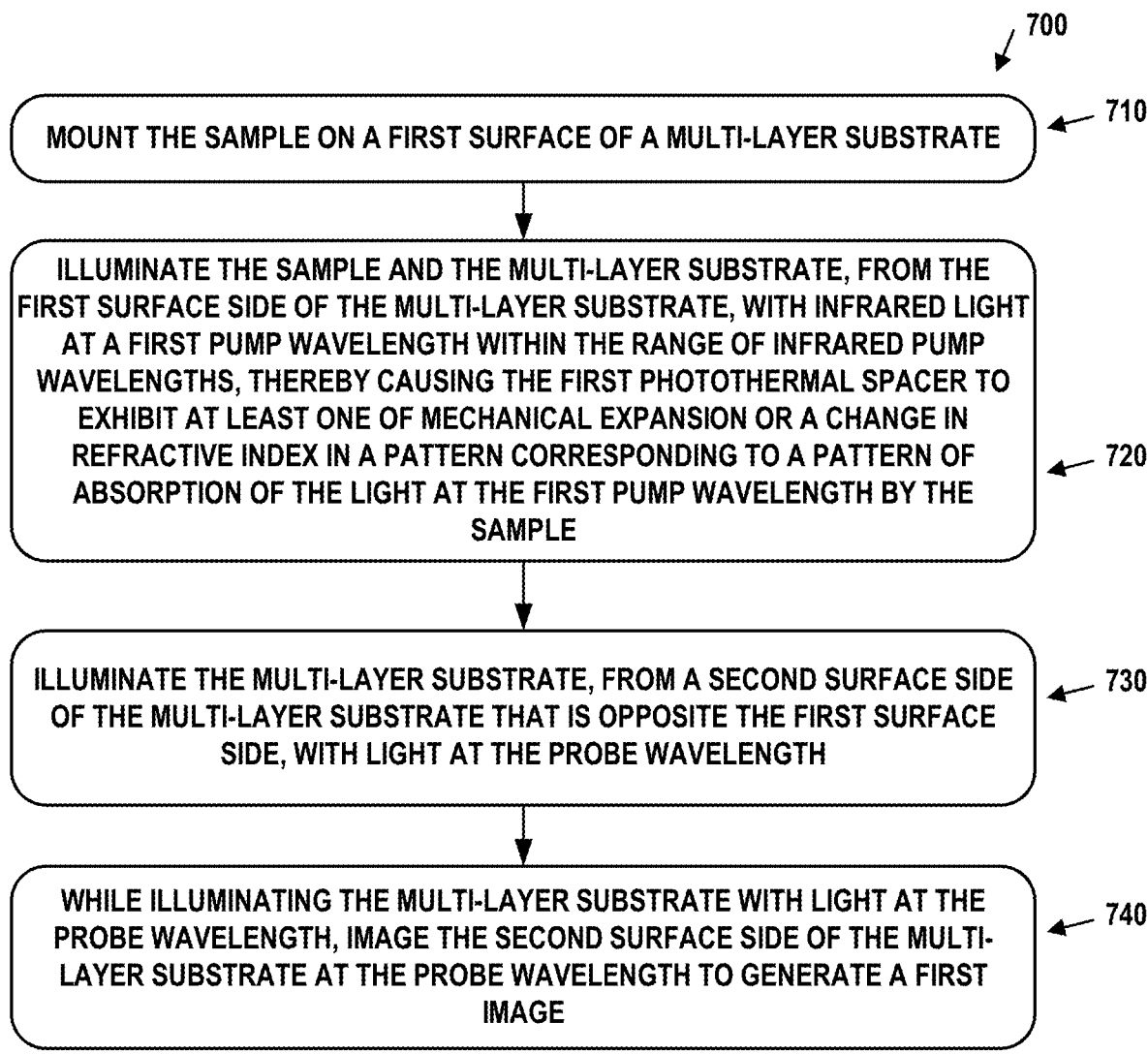
FIG. 7 is a flowchart of an example method.

FIG. 7 is a flow chart illustrating an example method 700 for photothermal imaging of a sample. The method 700 may be combined with features, aspects, and/or implementations of any of the previous figures or other embodiments otherwise described herein.

The method 700 includes mounting the sample on a first surface of a multi-layer substrate (710). The multi-layer substrate includes: (i) a mechanical support layer, wherein the mechanical support layer is transparent to a range of probe wavelengths; (ii) a first reflective layer disposed between the mechanical support layer and the first surface, wherein the first reflective layer is partially reflective and partially transparent to the range of probe wavelengths; (iii)

a first photothermal spacer layer disposed between the first reflective layer and the first surface, wherein the first photothermal spacer layer exhibits at least one of mechanical expansion or a change in refractive index at the range of probe wavelengths in response to heating; and (iv) a second reflective layer disposed between the first photothermal spacer layer and the first surface, wherein the second reflective layer is reflective to the range of probe wavelengths and to a range of infrared pump wavelengths.

The method 700 also includes illuminating the sample and the multi-layer substrate, from the first surface side of the multi-layer substrate, with infrared light at a first pump wavelength within the range of infrared pump wavelengths, thereby causing the first photothermal spacer to exhibit at least one of mechanical expansion or a change in refractive index in a pattern corresponding to a pattern of absorption of the light at the first pump wavelength by the sample (720). The method 700 additionally includes illuminating the multi-layer substrate, from a second surface side of the multi-layer substrate that is opposite the first surface side, with light at the probe wavelength (730). The method 700 yet further includes, while illuminating the multi-layer substrate with light at the probe wavelength, imaging the second surface side of the multi-layer substrate at the probe wavelength to generate a first image (740).

The method 700 could include additional or alternative elements or aspects to those depicted in FIG. 7.

IV. CONCLUSION

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting,

We claim:

1. A multi-layer substrate for photothermal imaging of a sample, wherein the substrate has a first surface side on which the sample can be disposed for photothermal imaging thereof, the substrate comprising:
a mechanical support layer, wherein the mechanical support layer is transparent to a range of probe wavelengths;
a first reflective layer disposed between the mechanical support layer and the first surface, wherein the first reflective layer is partially reflective and partially transparent to the range of probe wavelengths and does not transmit a range of infrared pump wavelengths;
a first photothermal spacer layer disposed between the first reflective layer and the first surface, wherein the first photothermal spacer layer exhibits at least one of mechanical expansion or a change in refractive index at the range of probe wavelengths in response to photothermal heating by light within the range of infrared pump wavelengths; and
a second reflective layer disposed between the first photothermal spacer layer and the first surface, wherein the second reflective layer is reflective to the range of probe wavelengths and at least partially transparent to the range of infrared pump wavelengths.

2. The substrate of claim 1, further comprising:
a third reflective layer disposed between the first photothermal spacer layer and the second reflective layer, wherein the third reflective layer is partially reflective and partially transparent to the range of probe wavelengths; and
a second photothermal spacer layer disposed between the third reflective layer and the second reflective layer, wherein the second photothermal spacer layer exhibits at least one of mechanical expansion or a change in refractive index at the range of probe wavelengths in response to photothermal heating by light within the range of infrared pump wavelengths, and
wherein a combination of the first, second, and third reflective layers and the first and second photothermal spacer layers exhibits destructive interference when illuminated, from a second surface side of the multi-layer substrate that is opposite the first surface side, with light at at least one wavelength within the range of probe wavelengths.

3. The substrate of claim 1, wherein the second reflective layer comprises germanium.

4. The substrate of claim 1, wherein the first photothermal spacer layer comprises poly-methyl methacrylate.

5. The substrate claim 1, wherein the first photothermal spacer layer comprises a bulk material and an additive material disposed within the bulk material, and wherein the additive material has an enhanced absorptivity with respect to the range of infrared pump wavelengths relative to the bulk material.

6. The substrate of claim 1, further comprising a layer of barium fluoride disposed between the first photothermal spacer layer and the first surface.

7. A method for photothermal imaging of a sample, the method comprising:
mounting the sample on a first surface of a multi-layer substrate, wherein the multi-layer substrate includes:
a mechanical support layer, wherein the mechanical support layer is transparent to a range of probe wavelengths;
a first reflective layer disposed between the mechanical support layer and the first surface, wherein the first reflective layer is partially reflective and partially transparent to the range of probe wavelengths;
a first thermal spacer layer disposed between the first reflective layer and the first surface, wherein the first thermal spacer layer exhibits at least one of mechanical expansion or a change in refractive index at the range of probe wavelengths in response to heating; and
a second reflective layer disposed between the first thermal spacer layer and the first surface, wherein the second reflective layer is reflective to the range of probe wavelengths and to a range of infrared pump wavelengths;
illuminating the sample and the multi-layer substrate, from the first surface side of the multi-layer substrate, with infrared light at a first pump wavelength within the range of infrared pump wavelengths, thereby causing the first thermal spacer to exhibit at least one of mechanical expansion or a change in refractive index in a pattern corresponding to a pattern of absorption of the light at the first pump wavelength by the sample;

illuminating the multi-layer substrate, from a second surface side of the multi-layer substrate that is opposite the first surface side, with light at the probe wavelength; and while illuminating the multi-layer substrate with light at the probe wavelength, imaging the second surface side of the multi-layer substrate at the probe wavelength to generate a first image.

8. The method of claim 7, wherein illuminating the sample and the multi-layer substrate with infrared light at the first pump wavelength, illuminating the multi-layer substrate with light at the probe wavelength, and imaging the second surface side of the multi-layer substrate at the probe wavelength are performed a plurality of times, and wherein a phasing between the timing of illuminating the sample and the multi-layer substrate with infrared light at the first pump wavelength and the timing of imaging the second surface side of the multi-layer substrate at the probe wavelength is specified to increase a magnitude of an effect of illuminating the sample and the multi-layer substrate with infrared light at the first pump wavelength on images generated by imaging the second surface side of the multi-layer substrate at the probe wavelength.

9. The method of claim 7, further comprising:
illuminating the sample and the multi-layer substrate, from the first surface side of the multi-layer substrate, with infrared light at a second pump wavelength within the range of infrared pump wavelengths, thereby causing the first thermal spacer to exhibit at least one of mechanical expansion or a change in refractive index in a pattern corresponding to a pattern of absorption of the light at the first pump wavelength by the sample;

illuminating the multi-layer substrate an additional time, from a second surface side of the multi-layer substrate that is opposite the first surface side, with light at the probe wavelength; and while illuminating the multi-layer substrate the additional time with light at the probe wavelength, imaging the second surface side of the multi-layer substrate an additional time at the probe wavelength to generate a second image.

10. The method of claim 7, further comprising:
illuminating the multi-layer substrate an additional time, from a second surface side of the multi-layer substrate that is opposite the first surface side while the sample and the multi-layer substrate are not being illuminated with infrared light within the range of infrared pump wavelengths, with light at the probe wavelength;

while illuminating the multi-layer substrate the additional time with light at the probe wavelength, imaging the second surface side of the multi-layer substrate an additional time at the probe wavelength to generate a second image; and generating an infrared absorption image of the sample based on a difference between the first image and the second image.

11. The method claim 7, wherein imaging the second surface side of the multi-layer substrate at the probe wavelength to generate the first image comprises operating a bright-field microscope to image the second surface side of the multi-layer substrate at the probe wavelength, and wherein the multi-layer substrate is located at a focal plane of the bright-field microscope.

12. The method of claim 7, wherein the second reflective layer comprises a layer of silver that has a thickness greater than 75 nm.

13. The method of claim 7, wherein the first thermal spacer layer comprises amorphous silicon.

14. The method of claim 13, wherein the first thermal spacer layer comprises a layer of amorphous silicon with a thickness greater than 55 nm.

15. A multi-layer substrate for photothermal imaging of a sample, wherein the substrate has a first surface on which the sample can be disposed for photothermal imaging thereof, the substrate comprising:
a mechanical support layer, wherein the mechanical support layer is transparent to a range of probe wavelengths;
a first reflective layer disposed between the mechanical support layer and the first surface, wherein the first reflective layer is partially reflective and partially transparent to the range of probe wavelengths;
a first thermal spacer layer disposed between the first reflective layer and the first surface, wherein the first thermal spacer layer exhibits at least one of mechanical expansion or a change in refractive index at the range of probe wavelengths in response to heating; and
a second reflective layer disposed between the first thermal spacer layer and the first surface, wherein the second reflective layer is reflective to the range of probe wavelengths and to a range of infrared pump wavelengths.

16. The substrate of claim 15, further comprising:
a third reflective layer disposed between the first thermal spacer layer and the second reflective layer, wherein the third reflective layer is partially reflective and partially transparent to the range of probe wavelengths; and
a second thermal spacer layer disposed between the third reflective layer and the second reflective layer, wherein the second thermal spacer layer exhibits at least one of mechanical expansion or a change in refractive index at the range of probe wavelengths in response to heating, and
wherein a combination of the first, second, and third reflective layers and the first and second thermal spacer layers exhibits destructive interference when illuminated, from a second surface side of the multi-layer substrate that is opposite the first surface side, with light at at least one wavelength within the range of probe wavelengths.

17. The substrate of claim 15, wherein the second reflective layer comprises silver.

18. The substrate of claim 17, wherein the second reflective layer comprises a layer of silver that has a thickness greater than 75 nm.

19. The substrate of claim 15, wherein the first thermal spacer layer comprises amorphous silicon.

20. The substrate of claim 15, wherein the first thermal spacer layer comprises a layer of amorphous silicon with a thickness greater than 55 nm.

* * * * *